US008527196B2

(12) United States Patent
Alasry et al.

(10) Patent No.: US 8,527,196 B2
(45) Date of Patent: Sep. 3, 2013

(54) SYSTEM AND METHOD FOR DETERMINING ROUTES TO DESIRED LOCATIONS

(75) Inventors: Bilal Alasry, Dearborn, MI (US); Doua Vang, Waterford, MI (US); Bryan Thomas, Canton, MI (US)

(73) Assignees: DENSO International America, Inc., Southfield, MI (US); Denso Corporation, Kariya (JP)

( * ) Notice: Subject to any disclaimer, the term of this patent is extended or adjusted under 35 U.S.C. 154(b) by 203 days.

(21) Appl. No.: 13/070,113

(22) Filed: Mar. 23, 2011

(65) Prior Publication Data
US 2012/0245843 A1    Sep. 27, 2012

(51) Int. Cl.
*G01C 21/00*    (2006.01)

(52) U.S. Cl.
USPC .......................................................... 701/410

(58) Field of Classification Search
USPC .................................................. 701/446, 410
See application file for complete search history.

(56) References Cited

U.S. PATENT DOCUMENTS

| 6,199,013 | B1 * | 3/2001  | O'Shea ........................ 701/431 |
| 6,812,888 | B2 * | 11/2004 | Drury et al. .............. 342/357.31 |
| 6,826,472 | B1 * | 11/2004 | Kamei et al. .................. 701/426 |
| 8,014,945 | B2 * | 9/2011  | Cooper et al. ................. 701/452 |
| 2002/0069038 | A1 * | 6/2002 | Cooper ......................... 702/191 |
| 2004/0064245 | A1 * | 4/2004 | Knockeart et al. ............ 701/117 |
| 2004/0104842 | A1 * | 6/2004 | Drury et al. .............. 342/357.13 |
| 2007/0299599 | A1 * | 12/2007 | Letchner et al. .............. 701/200 |
| 2008/0033633 | A1 * | 2/2008 | Akiyoshi et al. .............. 701/201 |
| 2008/0215883 | A1 * | 9/2008 | Fok et al. ....................... 713/167 |
| 2008/0262717 | A1 * | 10/2008 | Ettinger ........................ 701/206 |
| 2009/0204663 | A1 * | 8/2009 | Patwari ......................... 709/203 |

FOREIGN PATENT DOCUMENTS
WO    WO2010114161    7/2010

* cited by examiner

*Primary Examiner* — Thomas Tarcza
*Assistant Examiner* — Alex C Dunn
(74) *Attorney, Agent, or Firm* — Harness, Dickey & Pierce, P.L.C.

(57) ABSTRACT

A system includes a first module receives N points (N≧3) from a remote device, the N points indicating (i) a current location, (ii) a desired location, and (iii) one or more points between the current location and the desired location. A second module determines whether first information in a first datastore of the system is missing a link between each neighboring pair of points within the N points. A third module receives M points (M≧1) from the remote device for each missing one of the N−1 links, the M points indicating points between two of the N points associated with a missing link. A fourth module generates a route from the current location to the desired location based on the N points and the first information in a first datastore, and any M points received for missing ones of the N−1 links.

28 Claims, 7 Drawing Sheets

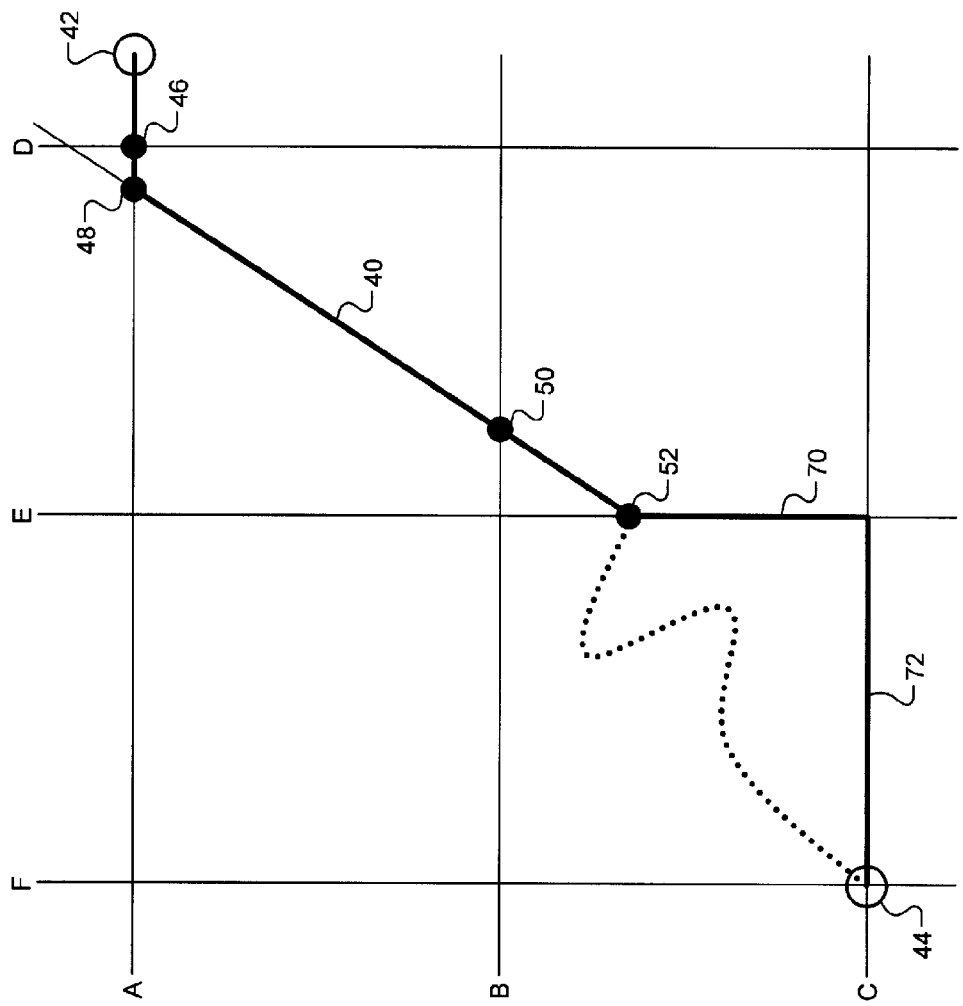

SYSTEM AND METHOD FOR DETERMINING ROUTES TO DESIRED LOCATIONS

FIELD

The present disclosure relates to navigation systems and more particularly to a system and method for determining routes to desired locations.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Navigation systems may provide a user with a route to a desired location. The route may include a series of directions and corresponding distances. Navigation systems may include vehicle navigation systems and handheld navigation devices. For example, vehicle navigation systems may provide a driver with a route that includes a series of distances for corresponding roads along with corresponding turns. Navigation systems may determine the route to the desired location based on stored information. For example, the stored information may be geographical data in a datastore. Navigation systems, however, may also transmit the desired location (and a current location) to another device. For example, the current location may be determined using the global positioning system (GPS). The other device may determine the desired route and transmit the desired route back to the navigation system which may display the route to the user. For example, the other device may be a third-party service provider.

SUMMARY

A system includes a first module which receives N points ($N \geq 3$ if the current location and desired location are included or $N \geq 1$ if these locations are not included in determining the value of N) from a remote device, the N points indicating (i) a current location, (ii) a desired location, and (iii) one or more points between the current location and the desired location. A second module determines whether first information in a first datastore of the system is missing a link between each neighboring pair of points within the N points. A third module receives M points ($M \geq 1$) from the remote device for each missing one of the N−1 links, the M points indicating points between two of the N points associated with a missing link. A fourth module generates a route from the current location to the desired location based on the N points and the first information in a first datastore, and any M points received for missing ones of the N−1 links.

A method includes receiving N points from a remote device, the N points indicating (i) a current location, (ii) a desired location, and (iii) one or more points between the current location and the desired location, wherein N is an integer greater than or equal to three, determining whether first information in a first datastore is missing a link between each neighboring pair of points within the N points, receiving M points from the remote device for each missing one of the N−1 links, the M points indicating points between two of the N points associated with a missing link, wherein M is an integer greater than or equal to one, and generating a route from the current location to the desired location based on the N points and the first information in a first datastore, and any M points received for missing ones of the N−1 links.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 3A-3C are diagrams illustrating example methods of route generation according to one implementation of the present disclosure;

DETAILED DESCRIPTION

Figure 1:
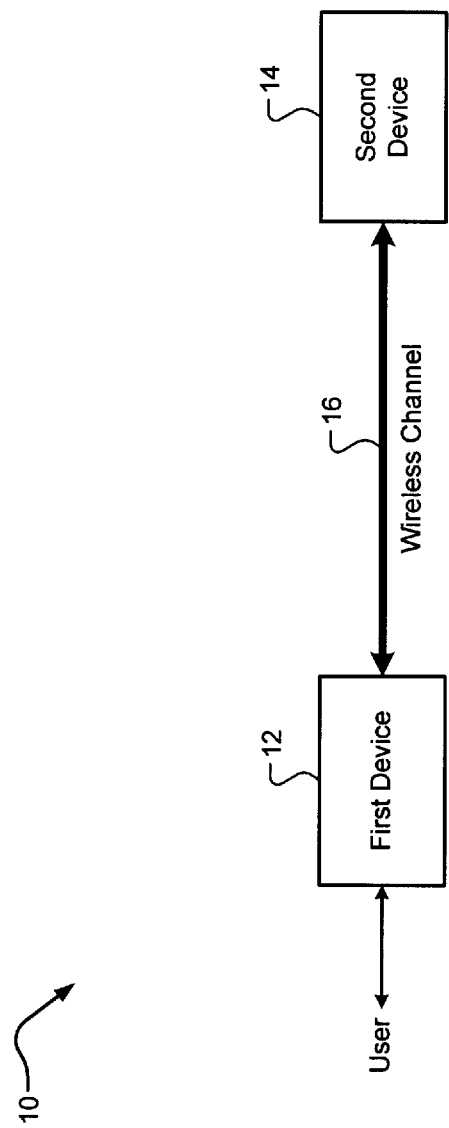
FIG. 1 is a functional block diagram of an example of a communication system according to one implementation of the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Devices may be configured to transmit and/or receive location data. Location data may be determined using the global position system (GPS). For example, a first device may transmit its current location and a desired location to a second device located remotely with respect to the first device. The second device (e.g., a third-party service provider) may then determine a desired route from the current location to the desired location. The second device may determine the desired route using information in a first datastore. For example, the first device may be a vehicle and the routes may include a series of distances for corresponding roads along with corresponding turns. The first device, however, may also be another device such as a handheld device and therefore the routes may include different information.

The second device may then transmit the desired route to the first device. However, to decrease transmission bandwidth, the second device may select points along the desired route and may transmit the points to the first device. For example, the points may be located at critical locations where decisions are required (e.g., intersections with multiple options). The first device may then generate (i.e., reconstruct) the route based on the points and information in second datastore. The information in the second datastore, however, may be different than the information in the first datastore. For example, the first datastore may not include information connecting two of the points. Therefore, the first device may fail when generating the route. Failing to generate the route may cause a user to become lost (e.g., at an intersection without knowing which way to proceed).

Accordingly, a system and method are presented for improved determination of routes to desired locations. The system and method may transmit a current location and a desired location to a remote device. The system and method may then receive N points from the remote device ($N \geq 3$), the N points indicating the current location, the desired location, and one or more points between the current location and the desired location. For example, the one or more points between the current location and the desired location may be located at critical/decision points along a desired route generated by the remote device based on second information in a second datastore.

The system and method may then determine whether first information in a first datastore is missing a link between each neighboring pair of points within the N points. For each determined missing link, the system and method may request M points from the remote device, the M points indicating points between two of the N points associated with the missing link. The system and method may then generate a route from the current location to the desired location based on the N points and the first information in the first datastore, and any M points received for missing ones of the N−1 links.

Additionally, when communication with the remote device fails (e.g., a wireless link fails) or when the user selects for the system/method to generate the route using only the first information in the first datastore (i.e., without M additional points for each of any missing links), the system and method may generate the route based on the N points and the first information in the first datastore. For example, the system and method may generate a route having a longer distance than the desired route (i.e., rerouting around the missing link). Finally, the system and method may output the generated route to the user (e.g., via audio and/or visual instructions).

Referring now to FIG. 1, an example of a communication system 10 is shown. The communication system 10 includes a first device 12 and a second device 14 located remotely with respect to the first device 12. The first device 12 and the second device 14 may communicate with each other via a wireless channel 16. The first device 12 may be a navigation system such as a vehicle navigation system or a handheld navigation device. The first device 12, however, may also be another suitable type of navigation system/device. The first device 12 may also use the global positioning system (GPS) to determine its current location. The second device 14 may be a third-party service provider of navigational information/services. For example, the second device 14 may be a server at a remote location. In addition, the wireless channel 16 may be a radio frequency (RF) channel. The wireless channel 16, however, may be another suitable type of wireless communication channel.

Figure 2:
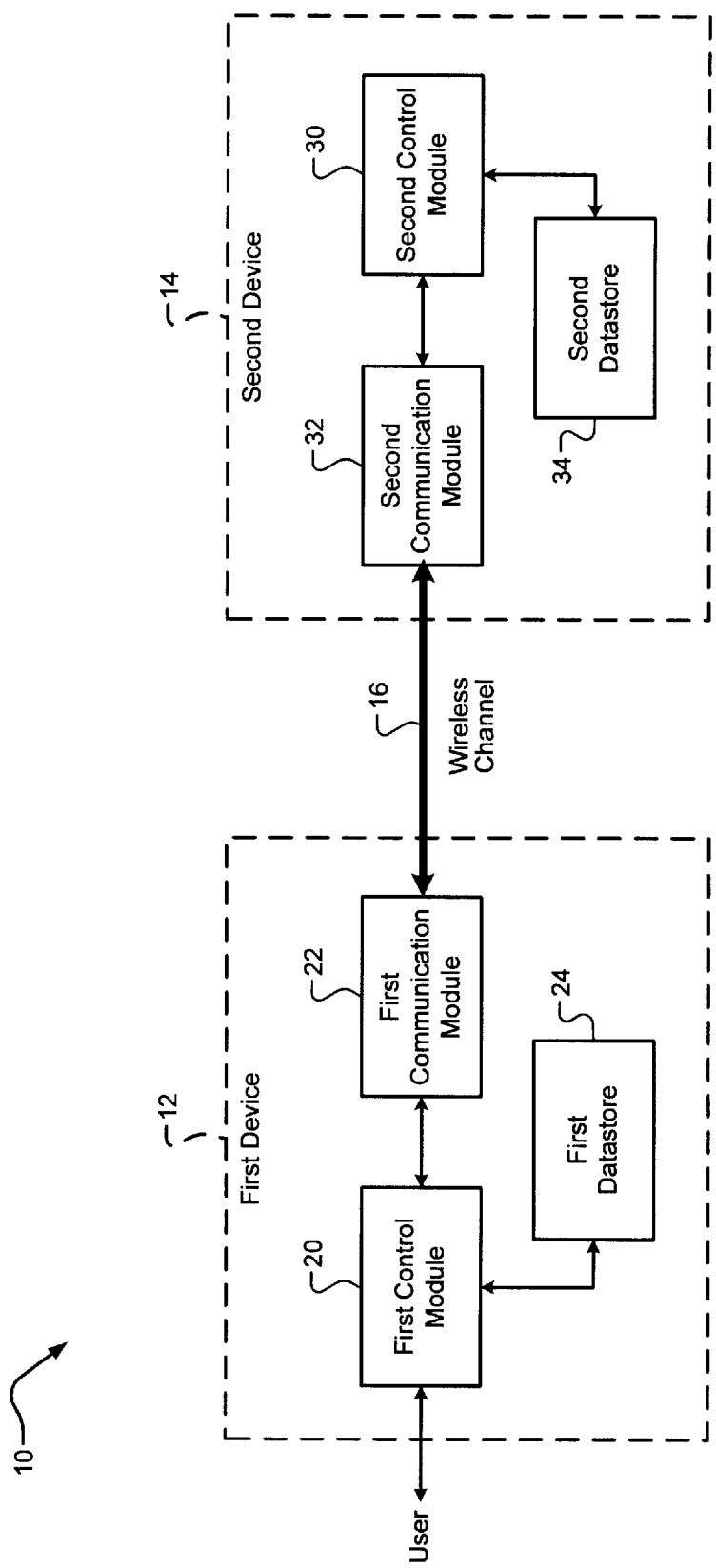
FIG. 2 is a functional block diagram of another example of the communication system according to one implementation of the present disclosure.

Referring now to FIG. 2, another example of the communication system 10 is shown. Specifically, the first device 12 and the second device 14 are shown in more detail. The first device 12 may include a first control module 20, a first communication module 22, and a first datastore 24. Similarly, the second device 14 may include a second control module 30, a second communication module 32, and a second datastore 34.

The first control module 20 may communicate with a user. Specifically, the user may input a desired location to the first control module 20. For example, the user may be a driver of a vehicle. The user may input the desired location via voice commands and/or via a physical input device (e.g., a touchpad or a touchscreen). The first control module 20 may send the desired location to the first communication module 22.

The first communication module 22 may transmit the desired location to the second device 14 via the wireless channel 16. For example, the first communication module 22 may include a transceiver for transmitting and receiving information across the wireless channel 16. The first communication module 22 may also transmit a current location of the first device 12 to the second device via the wireless channel 16. For example, the current location of the first device 12 may be determined using the GPS system.

The second communication module 32 receives the desired location and the current location of the first device 12 via the wireless channel 16. For example, the second communication module 32 may also include a transceiver for transmitting and receiving information across the wireless channel 16. The second communication module 32 may send the desired location and the current location of the first device 12 to the second control module 30.

The second control module 30 generates a desired route from the current location of the first device 12 to the desired location. Specifically, the second control module 30 generates the desired route using information in the second datastore 34. The second datastore 34 may include geographical information used in generating a route between two points. For example, the second datastore 34 may include paths, roads, highways, etc. The second datastore 34, however, may include other suitable types of geographical information.

After generating the desired route, the second control module 30 may determine a plurality of points along the desired route for transmission back to the first device 12. Transmitting a plurality of points decreases bandwidth compared to transmitting the entire desired route. Specifically, the second control module 30 may select N points along the desired route ($N>1$). The N points may include the current location, the desired location, and one or more points in between the current location and the desired location. For example, each of the points may include a geographical latitude and longitude pair.

The second control module 30 may select the N points such that each of the N points is at a critical location where a decision is required. For example, the second control module 30 may select the N points such that each of the N points is at an intersection where the user may proceed in multiple different directions. The second control module 30, however, may also select the N points according to other suitable methods.

The second communication module 32 may receive the N points from the second control module 30. The second communication module 32 may transmit the N points to the first device 12 via the wireless channel 16. In addition, the second communication module 32 may transmit additional data to the first device 12 such as the value of N. For example, the value of N may be the first data transmitted to the first device 12. The value of N may notify the first device 12 of how many points to be expecting. The first communication module 22 may receive the N points and any additional data via the wireless channel 16. The first communication module 22 may send the N points to the first control module 20.

The first control module 20 may generate a route based on the N points. In other words, the first control module 20 may attempt to reconstruct the desired route generated by the second control module 30. However, the information in the second datastore 34 may differ than the information in the first datastore 24. For example, the first datastore 24 may not include information connecting two of the N points.

Figure 3A:
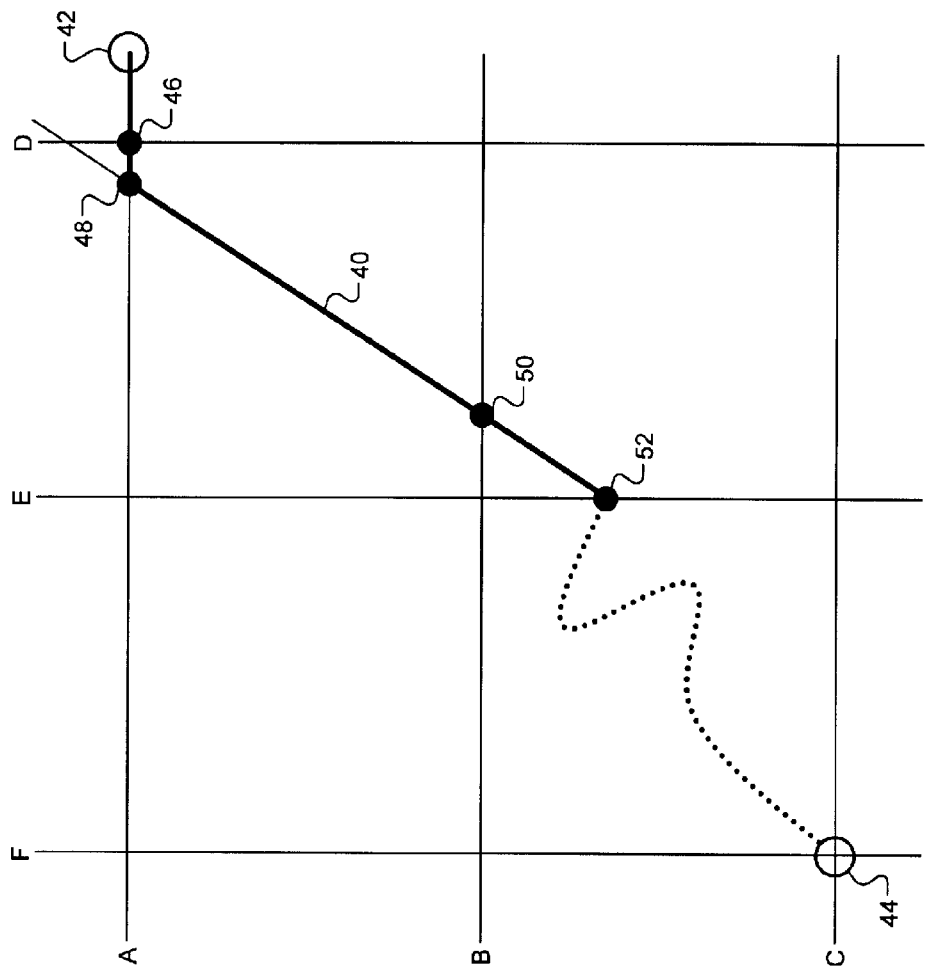

FIG. 3A illustrates a missing link. The desired route 40 is divided into four points (N=4) between a current location 42 and a desired location 44. The four points may be referred to as 46, 48, 50, and 52, respectively (proceeding from the current location 42 towards the desired location 44). The missing link is located between the fourth point 52 and the desired location 44. In other words, the first datastore 24 does not include this route. In this situation, the first control module 20, therefore, may do one or two things.

(1) The first control module 20 may request additional points from the second device 14. Specifically, the first control module 20 may send the two points having the missing link (e.g., 52 and 44) to the first communication module 22. The first communication module 22 may transmit the two points to the second device 14. The first communication module 22 may also transmit other information or additional information such as a distance between the two points. The second communication module 32 receives the two points and any additional information and sends the received data to the second control module 30.

Figure 3B:
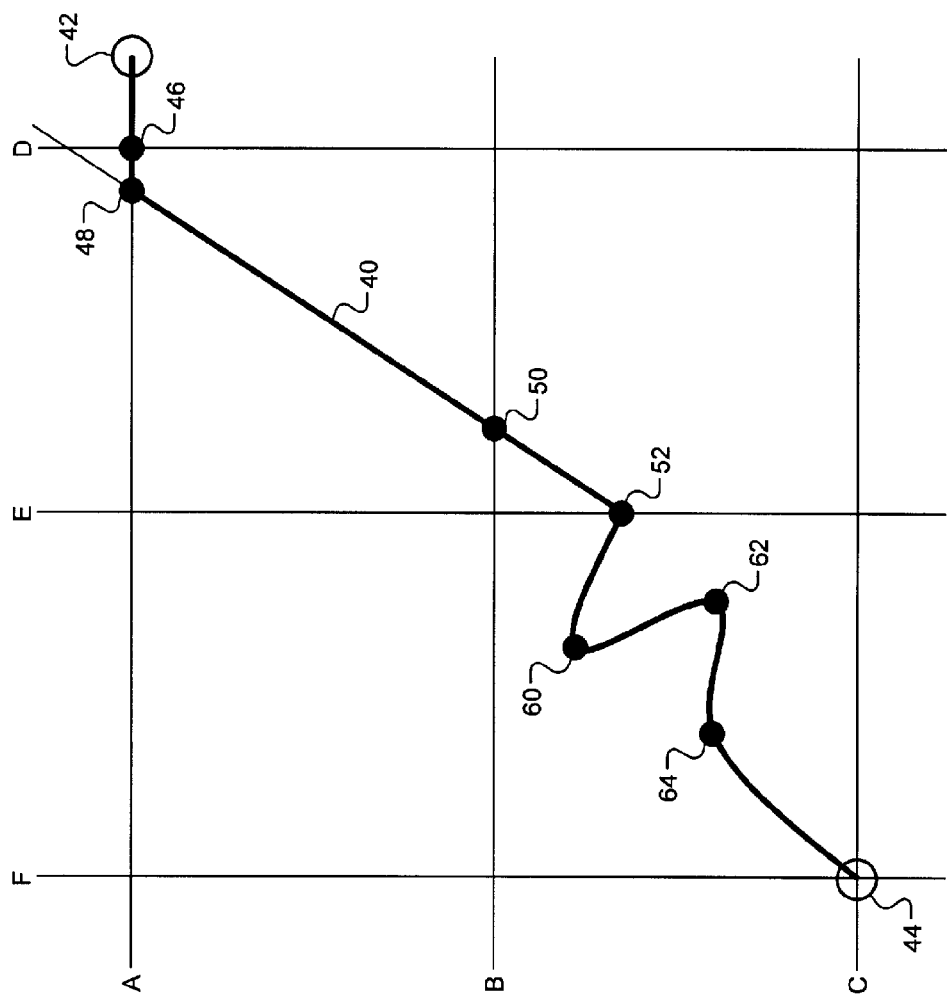

The second control module 30 may then select M points along the desired route between the two received points (M>1). The M points, however, may not correspond to critical locations. For example, each of the M points may be equidistant from each other between the two points. FIG. 3B illustrates an additional three points (M=3) along the desired route between the two points (52 and 44). The second control module 30 may send the M points to the second communication module 32 which may then transmit the M points back to the first device 12.

The first communication module 22 receives the M points. The first control module 20 may then generate a sub-route between the two points having the missing link based on the M points. For example, as shown in FIG. 3B, the M points (M=3) represented by 60, 62, and 64 may be used to complete the generated route from the current location to the desired location. In other words, the first control module 20 may generate the route based on the N points and any M points associated with missing links. The first control module 22 may then output the route to the user. For example, the route may be communicated to the user via audio and/or visual instructions.

(2) Alternatively, the first control module 20 may complete the generated route using the information in the first datastore 24. For example, the first control module 20 may generate a route between the two points having the missing link that is longer/less efficient than the desired route between the two points. FIG. 3C illustrates the alternative generated route around the missing link from 52 to 44. As shown, the first control module 20 may navigate along known routes (i.e., information in the first datastore 24) represented by 70 and 72. For example, the first control module 20 may generate the route itself when communication between the first device 12 and the second device 14 is inoperable (e.g., a failed wireless channel 16). Additionally or alternatively, the user may command the first control module 20 to complete generation of the route itself instead of requesting the additional M points from the second device 14.

Figure 4:
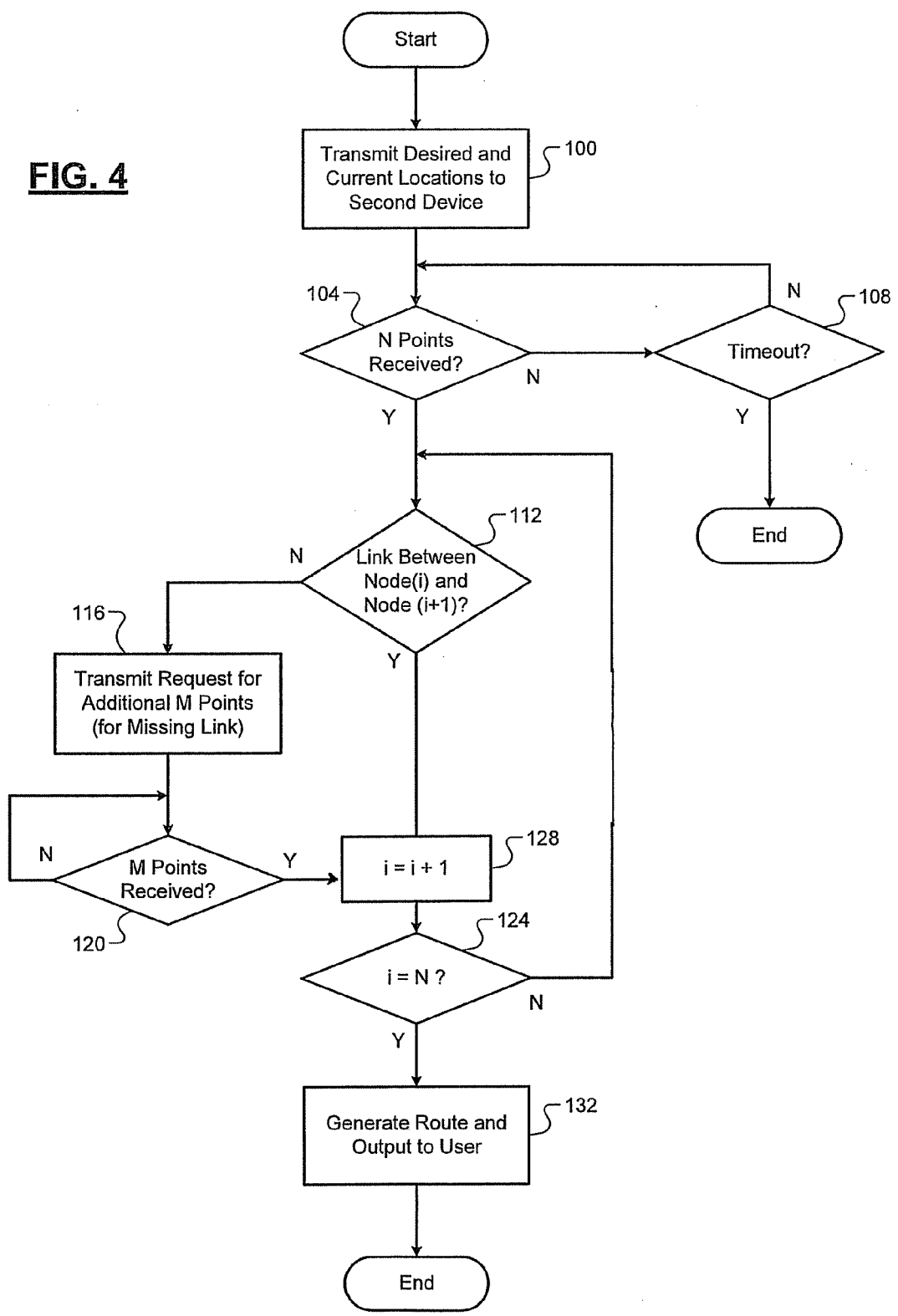
FIG. 4 is a flow diagram illustrating an example method for determining routes to desired locations according to one implementation of the present disclosure.

Referring now to FIG. 4, an example of a method for determining routes to desired locations begins at 100. At 100, the first device 12 transmits a desired location (input by a user) and its current location to the second device 14. At 104, the first device 12 determines whether the N points have been received from the second device 14. For example, the first device 12 may first receive the value of N and may then determine whether the N points are received thereafter. If false, control may proceed to 108. If true, control may proceed to 112. At 108, the first device 12 determines whether a timeout has occurred. For example, the first device 12 may determine whether a predetermined period has elapsed without receiving the N points. If true, control may end. If false, control may return to 104.

At 112, the first device 12 determines whether a link exists between node (i) and node (i+1). For example, the first device 12 may first initialize i to one and may then determine whether a first one of the N points (node(i)) has a link to a next one of the N points (node(i+1)). The first device 12 may determine the existence of a link using the first database 24. If a link does not exist (i.e., a missing link), control may proceed to 116. If a link does exist, control may proceed to 124.

At 116, the first device 12 may transmit a request to the second device 14 for M more points. Specifically, the M points may be located between the two points having the missing link (node(i) and node(i+1)). At 120, the first device 12 may determine whether the M points have been received. If false, control may return to 120. If true, control may proceed to 128. At 128, the first device 12 may increment i by one (i=i+1). At 124, the first device 12 may determine whether i equals N. If false, control may return to 112 to determine the existence of a new link.

At 124, if true, control may proceed to 132. At 132, the first device 12 may generate the route and output the generated route to the user. Specifically, the generated route may include connecting the N points including connecting any sets of M points received for missing links between ones of the N points. Control may then end.

Figure 5:
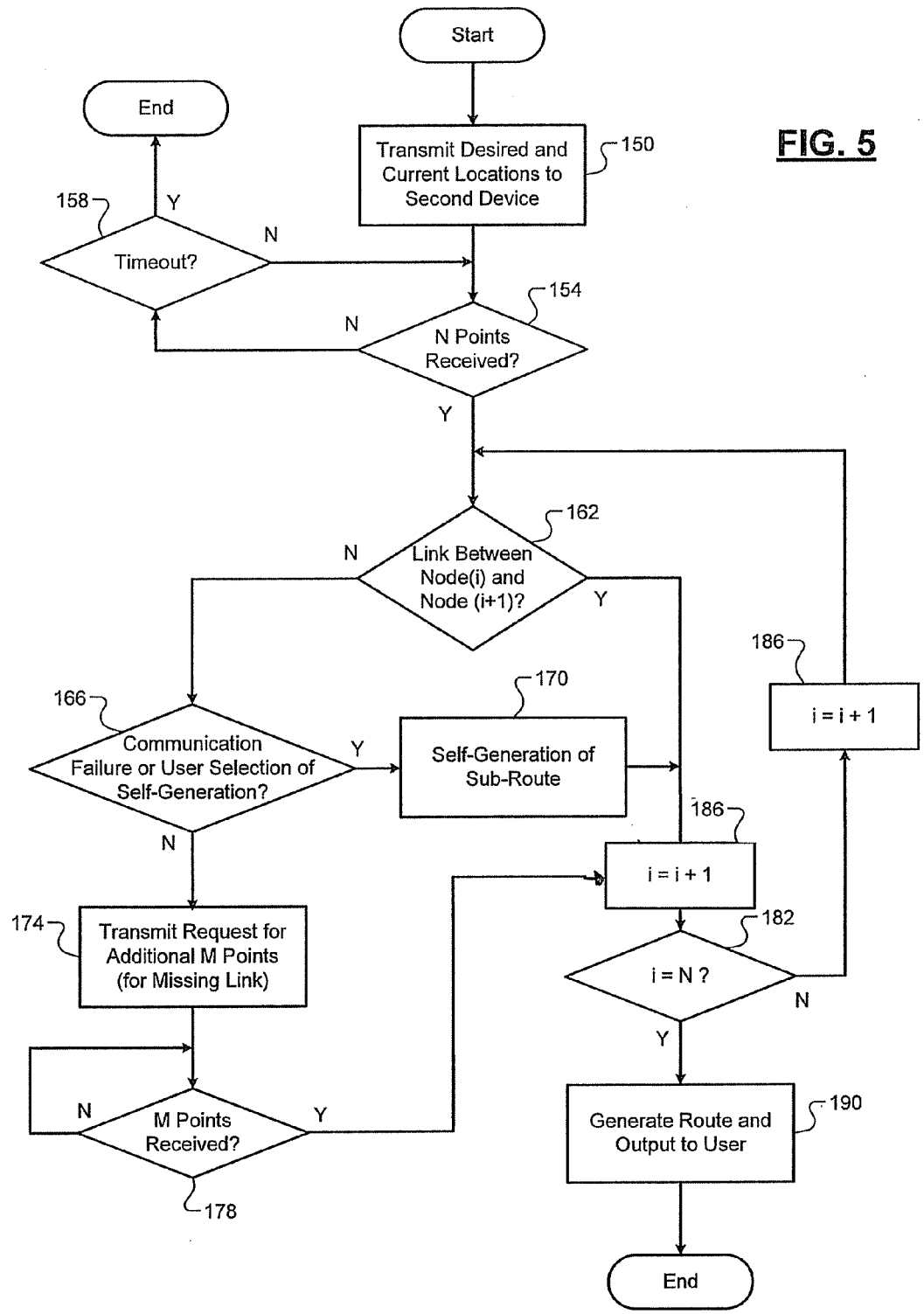
FIG. 5 is a flow diagram illustrating another example method for determining routes to desired locations according to one implementation of the present disclosure.

Referring now to FIG. 5, an example of a method for determining routes to desired locations begins at 150. At 150, the first device 12 transmits a desired location (input by a user) and its current location to the second device 14. At 154, the first device 12 determines whether the N points have been received from the second device 14. For example, the first device 12 may first receive the value of N and may then determine whether the N points are received thereafter. If false, control may proceed to 158. If true, control may proceed to 162. At 158, the first device 12 determines whether a timeout has occurred. For example, the first device 12 may determine whether a predetermined period has elapsed without receiving the N points. If true, control may end. If false, control may return to 154.

At 162, the first device 12 determines whether a link exists between node (i) and node (i+1). For example, the first device 12 may first initialize i to one and may then determine whether a first one of the N points (node(i)) has a link to a next one of the N points (node(i+1)). The first device 12 may determine the existence of a link using the first database 24. If a link does not exist (i.e., a missing link), control may proceed to 166. If a link does exist, control may proceed to 186.

At 166, the first device 12 determines whether communication between the first device 12 and the second device 14 has failed (i.e., failure of wireless channel 16) or the user has selected self-generation (i.e., generation of the route using the first database 24 and not requesting any sets of M points for missing links). If true, control may proceed to 170. If false, control may proceed to 174. At 170, the first device 12 may generate the sub-route between the two points having the missing link (node(i) and node(i+1)) by itself (i.e., using information in the first datastore 24. Control may then proceed to 186.

At 174, first device 12 may transmit a request to the second device 14 for M more points. Specifically, the M points may be located between the two points having the missing link (node(i) and node(i+1)). At 178, the first device 12 may determine whether the M points have been received. If false, control may return to 178. If true, control may proceed to 186. At 186, the first device 12 may increment i by one (i=i+1). At 182 the first device 12 may determine whether i=N. If false, control may then return to 162 to determine the existence of a next link. At 182, if true, control may proceed to 190. At 190, the first device 12 may generate the route and output the generated route to the user. Specifically, the generated route may include connecting the N points including connecting any sets of M points received for missing links between ones of the N points. Control may then end.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system, comprising:
    a first module in a first device that via communications receives N points from a second device which is at a remote location with respect to the first device, the N points indicating
        (i) a current location of the system,
        (ii) a desired location, and
        (iii) one or more points between the current location and the desired location, wherein N is an integer greater than or equal to three;
    a second module in the first device that determines whether first information in a first datastore in the first device is missing a link between each neighboring pair of points within the N points;
    a third module in the first device that receives M points from the second device for each missing one of the N−1 links, the M points indicating points between two of the N points associated with a missing link, wherein M is an integer greater than or equal to one; and
    a fourth module in the first device that generates a route from the current location to the desired location based on the N points and the first information in the first datastore, and any M points received for missing ones of the N−1 links.

2. The system of claim 1, further comprising a fifth module in the first device that receives the desired location as input from a user.

3. The system of claim 2, further comprising a sixth module in the first device that transmits the desired location and the current location to the second device.

4. The system of claim 3, wherein the second device generates a desired route based on the desired location, the current location, and second information in a second datastore in the second device.

5. The system of claim 4, wherein the second device selects the N points based on the desired route, wherein each of the N points is located at a critical point along the desired route where a decision is required.

6. The system of claim 5, wherein the fifth module disables the third module thereby disabling a requesting of and the receiving of M points for any missing ones of the N−1 links, wherein the fifth module disables the third module when selected by a user or when communication between the system and the second device fails.

7. The system of claim 6, wherein the fourth module generates the route based on the N points and the first information in the first datastore when the third module is disabled.

8. The system of claim 7, wherein the second information in the second datastore is different than the first information in the first datastore.

9. The system of claim 8, wherein the generated route is different than the desired route.

10. A vehicle comprising the system of claim 2, wherein the user is a driver of the vehicle, and wherein the second device is a third-party service provider.

11. A method, comprising:
    receiving in a first device via communications N points from a second device which is at a remote location with respect to the first device, the N points indicating
        (i) a current location,
        (ii) a desired location, and
        (iii) one or more points between the current location and the desired location, wherein N is an integer greater than or equal to three;
    determining in the first device whether first information in a first datastore in the first device is missing a link between each neighboring pair of points within the N points;
    receiving in the first device M points from the second device for each missing one of the N−1 links, the M points indicating points between two of the N points associated with a missing link, wherein M is an integer greater than or equal to one; and
    generating in the first device a route from the current location to the desired location based on the N points and the first information in the first datastore, and any M points received for missing ones of the N−1 links.

12. The method of claim 11, further comprising receiving in the first device the desired location as input from a user.

13. The method of claim 12, further comprising transmitting from the first device the desired location and the current location to the second device.

14. The method of claim 13, wherein the second device generates a desired route based on the desired location, the current location, and second information in a second datastore in the second device.

15. The method of claim 14, wherein the second device selects the N points based on the desired route, wherein each of the N points is located at a critical point along the desired route where a decision is required.

16. The method of claim 15, further comprising disabling in the first device the receiving of the M points thereby disabling a requesting of and the receiving of M points for any missing ones of the N−1 links, wherein the receiving of the M points is disabled when selected by a user or when communication with the second device fails.

17. The method of claim 16, further comprising generating the route based on the N points and the first information in the first datastore when the third module is disabled.

18. The method of claim 17, wherein the second information in the second datastore is different than the first information in the first datastore.

19. The method of claim 18, wherein the generated route is different than the desired route.

20. A vehicle that implements the method of claim 12, wherein the user is a driver of the vehicle, and wherein the second device is a third-party service provider.

21. The system of claim 5, wherein the missing link is caused when the second device selects the N points to decrease transmission bandwidth of the communications.

22. The system of claim 1, wherein
the first device is one of a vehicle device and a handheld device, and
the second device is a service provider that provides a geometrical route defined with the N points to the first device.

23. The system of claim 1, wherein the communications are wireless communications.

24. The system of claim 1, wherein the first device is located in a vehicle, and the second device is outside the vehicle.

25. The method of claim 15, wherein the missing link is caused when the second device selects the N points to decrease transmission bandwidth of the communications.

26. The method of claim 11, wherein
the first device is one of a vehicle device and a handheld device, and
the second device is a service provider that provides a geometrical route defined with the N points to the first device.

27. The method of claim 11, wherein the communications are wireless communications.

28. The method of claim 11, wherein the first device is located in a vehicle, and the second device is outside the vehicle.

* * * * *